(12) United States Patent
Malone

(10) Patent No.: US 9,155,423 B2
(45) Date of Patent: Oct. 13, 2015

(54) ROASTING RACK

(71) Applicant: CAMERONS PRODUCTS LLC, Milford, CT (US)

(72) Inventor: Chris Malone, Colorado Springs, CO (US)

(73) Assignee: Camerons Products LLC, Milford, CT (US)

( * ) Notice: Subject to any disclaimer, the term of this patent is extended or adjusted under 35 U.S.C. 154(b) by 311 days.

(21) Appl. No.: 13/719,446

(22) Filed: Dec. 19, 2012

(65) Prior Publication Data

US 2014/0165853 A1    Jun. 19, 2014

(51) Int. Cl.
*A47J 43/18* (2006.01)
*A47J 37/06* (2006.01)
*A47J 37/07* (2006.01)

(52) U.S. Cl.
CPC ...................................... *A47J 43/18* (2013.01)

(58) Field of Classification Search
CPC ........... A47J 43/18; A37J 37/01; A37J 37/10; A37J 37/0694; A37J 37/0763; A37J 37/049; A37J 37/06
USPC .... 99/426, 431, 421 A, 421 R, 421 V, 421 H, 99/421 HH; 126/29, 30, 9 R, 40, 1 R, 26, 126/25 AA, 25 A, 11; 248/439, 156, 545, 248/410, 419; 426/281, 523
See application file for complete search history.

(56) References Cited

U.S. PATENT DOCUMENTS

| | | | | |
|---|---|---|---|---|
| 849,290 | A * | 4/1907 | Vanderbilt | 99/426 |
| 2,604,884 | A * | 7/1952 | Walker | 126/30 |
| 2,847,932 | A * | 8/1958 | More | 99/421 H |
| 2,879,539 | A * | 3/1959 | Cervin | 452/58 |
| 2,887,944 | A * | 5/1959 | Walker | 99/421 HH |
| 3,877,109 | A * | 4/1975 | Moncrief | 452/174 |
| 3,986,445 | A * | 10/1976 | Hooton | 99/426 |
| 4,407,189 | A * | 10/1983 | Bentson | 99/421 HH |
| 4,421,017 | A * | 12/1983 | Ross | 99/421 R |
| 4,557,188 | A * | 12/1985 | Spanek | 99/415 |
| 4,709,626 | A * | 12/1987 | Hamlyn | 99/426 |
| 5,025,715 | A * | 6/1991 | Sir | 99/421 HV |
| 5,069,117 | A * | 12/1991 | Schlessel | 99/419 |
| 5,106,642 | A * | 4/1992 | Ciofalo | 426/509 |
| 5,442,999 | A * | 8/1995 | Meister | 99/426 |
| 5,638,742 | A * | 6/1997 | Kassaseya | 99/426 |
| 5,662,028 | A * | 9/1997 | Fraga | 99/419 |
| 5,730,046 | A * | 3/1998 | Battaglia et al. | 99/426 |
| 5,791,235 | A * | 8/1998 | Anselmo | 99/426 |
| 5,842,409 | A * | 12/1998 | Loffler et al. | 99/421 V |
| 5,913,965 | A * | 6/1999 | Gargano | 99/346 |
| 6,039,373 | A * | 3/2000 | Horn | 294/15 |
| 6,314,869 | B1 * | 11/2001 | Bourgeois, Jr. | 99/340 |
| 6,502,503 | B1 * | 1/2003 | Bell et al. | 99/419 |
| 7,040,219 | B1 * | 5/2006 | D'Amato et al. | 99/426 |

(Continued)

*Primary Examiner* — Hung D Nguyen
(74) *Attorney, Agent, or Firm* — Mark Nowotarski

(57) ABSTRACT

A roasting rack for cooking fowl comprising a horizontally disposed U shaped stand having integrally interconnected and spaced apart mutually parallel legs, a vertically disposed post detachably connected to the stand, said post having first and second vertically spaced apart branches projecting over the stand where the first and second branches are situated in a vertical plane that bisects the space between the legs of the stand, a handle pivotally attached to the first branch and a fowl supporting saddle attached to the second branch.

10 Claims, 6 Drawing Sheets

(56) References Cited

U.S. PATENT DOCUMENTS

| | | |
|---|---|---|
| 2002/0100371 A1* | 8/2002 | Snoke et al. .................... 99/419 |
| 2004/0187699 A1* | 9/2004 | Citrynell et al. ................ 99/345 |
| 2006/0266227 A1* | 11/2006 | Britt et al. ...................... 99/426 |
| 2006/0283335 A1* | 12/2006 | Vasquez .......................... 99/403 |
| 2007/0039484 A1* | 2/2007 | Leibowitz ....................... 99/426 |
| 2007/0181006 A1* | 8/2007 | Measom ......................... 99/345 |
| 2009/0087535 A1* | 4/2009 | Smith ............................ 426/523 |
| 2011/0209627 A1* | 9/2011 | Wong .............................. 99/419 |

* cited by examiner

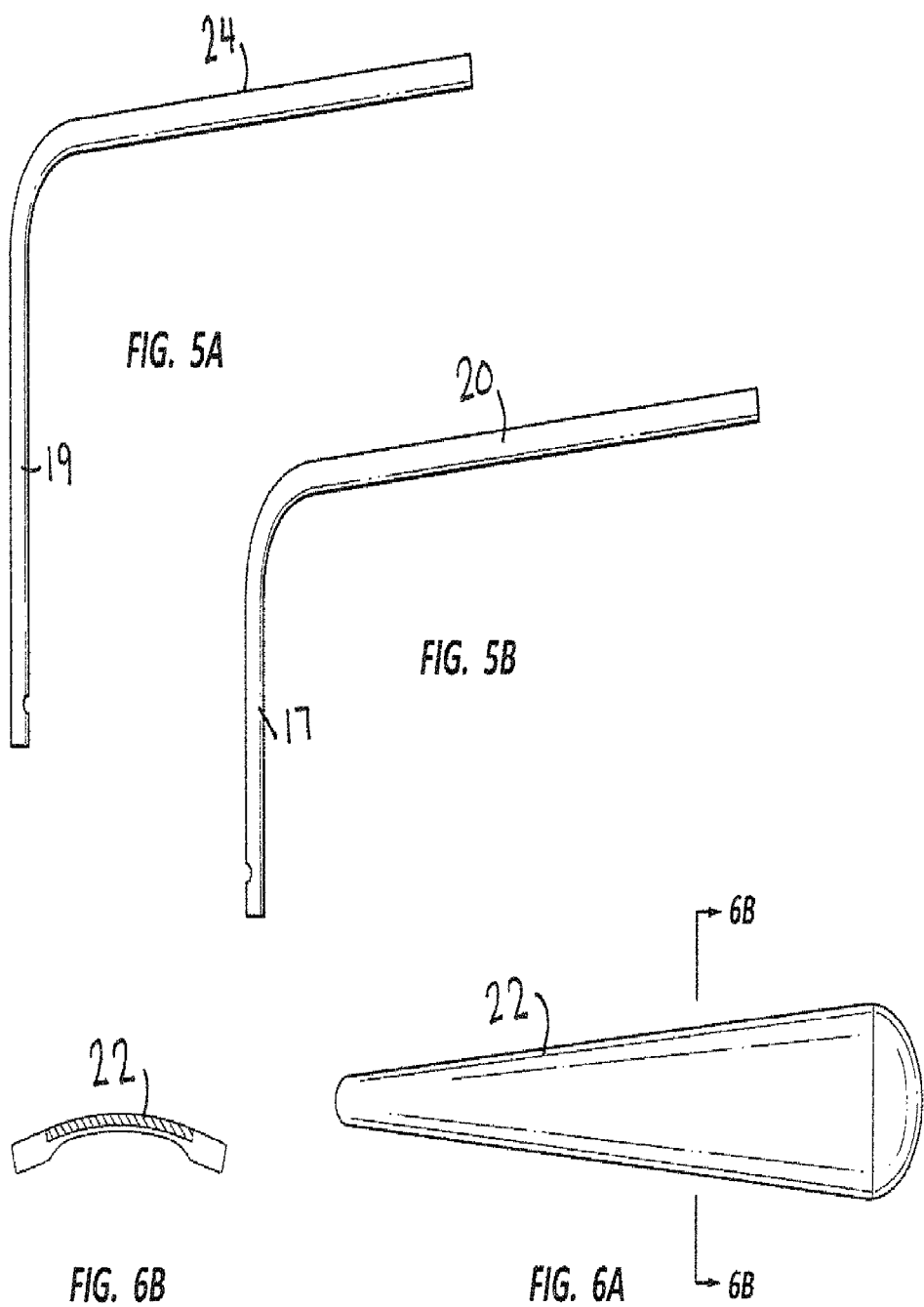

ROASTING RACK

FIELD OF THE INVENTION

The present invention relates to a device for supporting fowl in an oven or grill during the cooking process.

BACKGROUND OF THE INVENTION

Birds, such as chickens and turkeys, are most often roasted in a pan where the flat back of the bird rests on the bottom of the pan and the breast of the bird faces upwardly. In this position the meat juices tend to move downwardly toward the back and into the roasting pan. Accordingly, it is the primary object of the present invention to provide a holding rack that positions the bird upside down for cooking, allowing the juices to run into the breast instead of away from it. Additional advantages of the rack of the present invention include cooking the bird in the air and not in the fat. Basting is not required because the bird browns evenly.

SUMMARY OF THE INVENTION

The roasting rack of the present invention comprises a horizontally disposed stand having interconnected and spaced apart legs, a vertically disposed post supported by the stand, where the post has first and second vertically spaced apart and superimposed branches that project over the legs of the stand.

DESCRIPTION OF THE DRAWINGS

FIG. 5A is a side view of a portion of the vertical support wire post having a bent portion that carries a handle, as shown in FIG. 7.

FIG. 5B is a side view of a portion of the vertical support wire post having a bent portion that carries the bird supporting saddle, as shown in FIG. 7.

FIG. 6A is a top view of the bird supporting saddle.

FIG. 6B is a cross sectional view taken along lines 6B of FIG. 6A.

DETAILED DESCRIPTION OF PREFERRED EMBODIMENT

Figure 1:
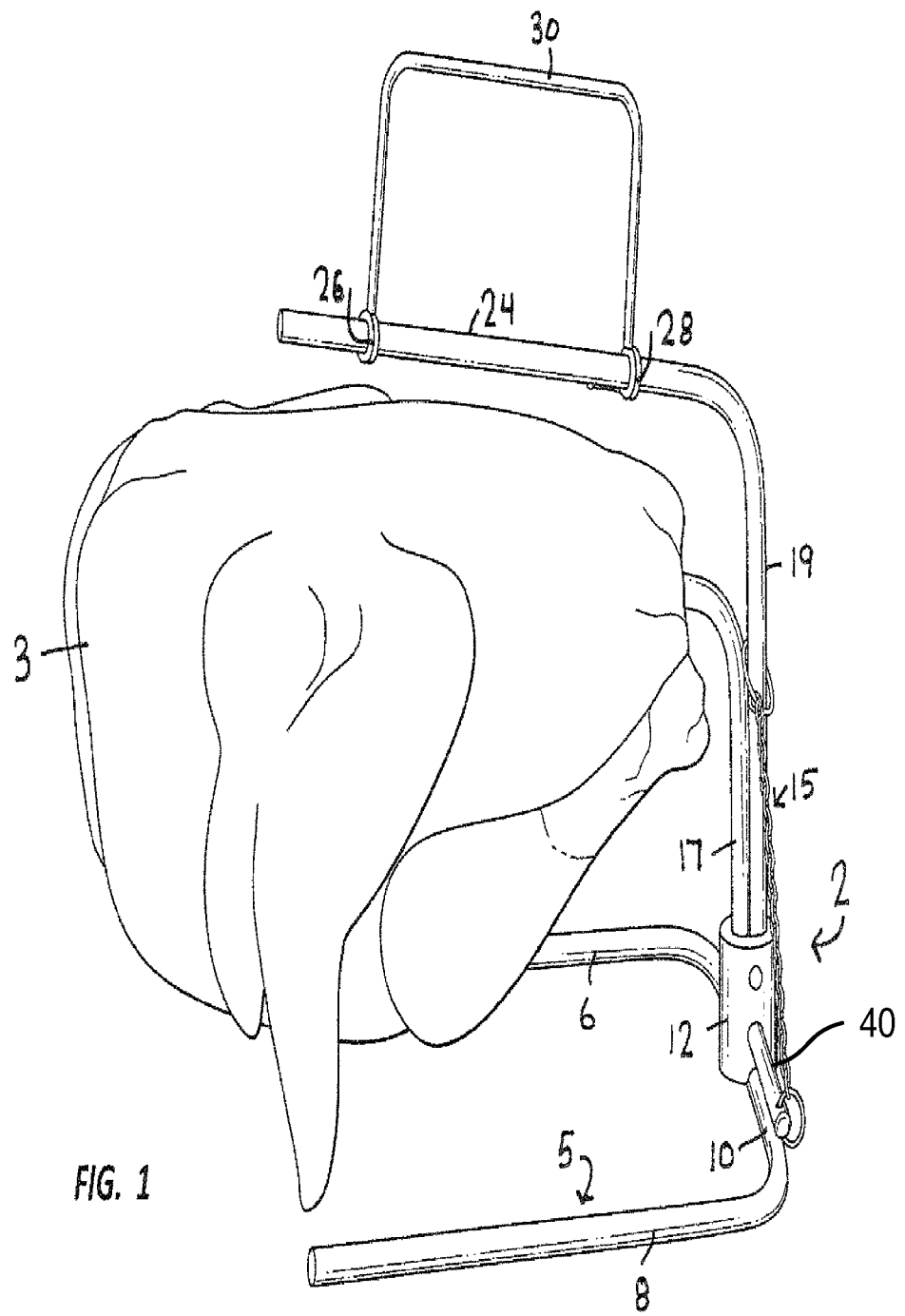
FIG. 1 is a side view of the roasting rack as it would appear holding a turkey.
Figure 2:
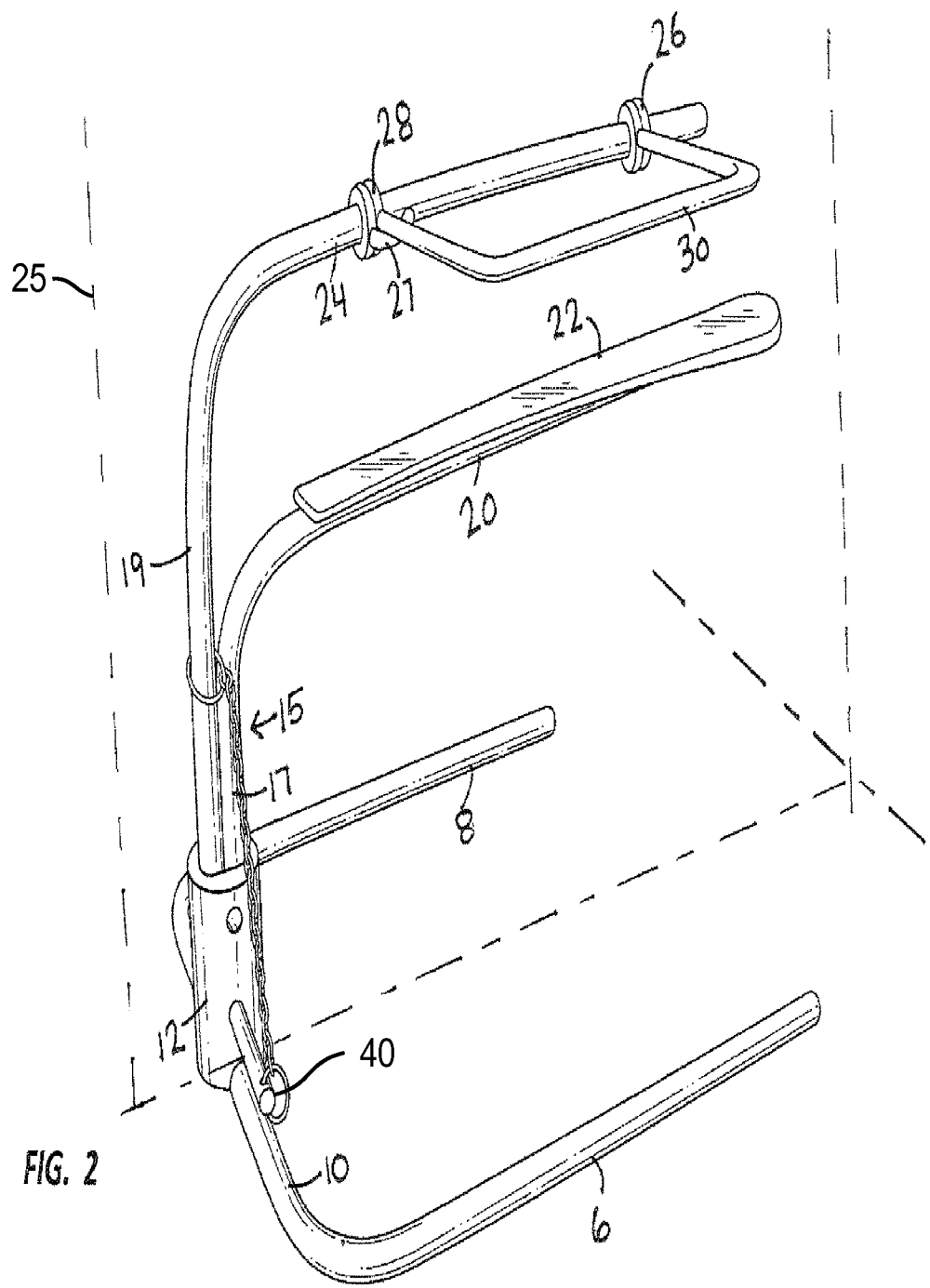
FIG. 2 is a perspective view of the roasting rack of the present invention.

The roasting rack 2 of the present invention is shown in FIGS. 1 and 2. FIG. 1 is illustrative of the stand supporting a turkey 3 that is held upside down by the roasting rack. In order to support a weight of twenty five to thirty pounds, the basic elements are preferably constructed of stainless steel rod or wire having a diameter in the order of 5/16 of an inch. A horizontally positioned stand 5 for the rack includes a U shaped base having mutually parallel spaced apart legs 6 and 8 that are integrally interconnected by bar 10. A rigid mounting sleeve 12 is fixedly secured to the midpoint of the bar 10 so that the longitudinal axis of the sleeve is vertical and perpendicular to the bar 10. The central opening 14 through the sleeve is shaped to accept the supporting post 15 of the rack.

In the preferred embodiment of the invention the bird 3 to be roasted is supported by one substantially horizontal branch 20 of the supporting post 15 which is bent from and is integral with a circular rod 17 forming one half of the vertically disposed post 15. Mounted on the top side of the branch 20 is a bird supporting saddle 22 which in intended to make broad contact with the interior of the bird and provide sufficient support so that the bird will not tend to rotate on the rod that comprises the branch 20.

Figure 3:
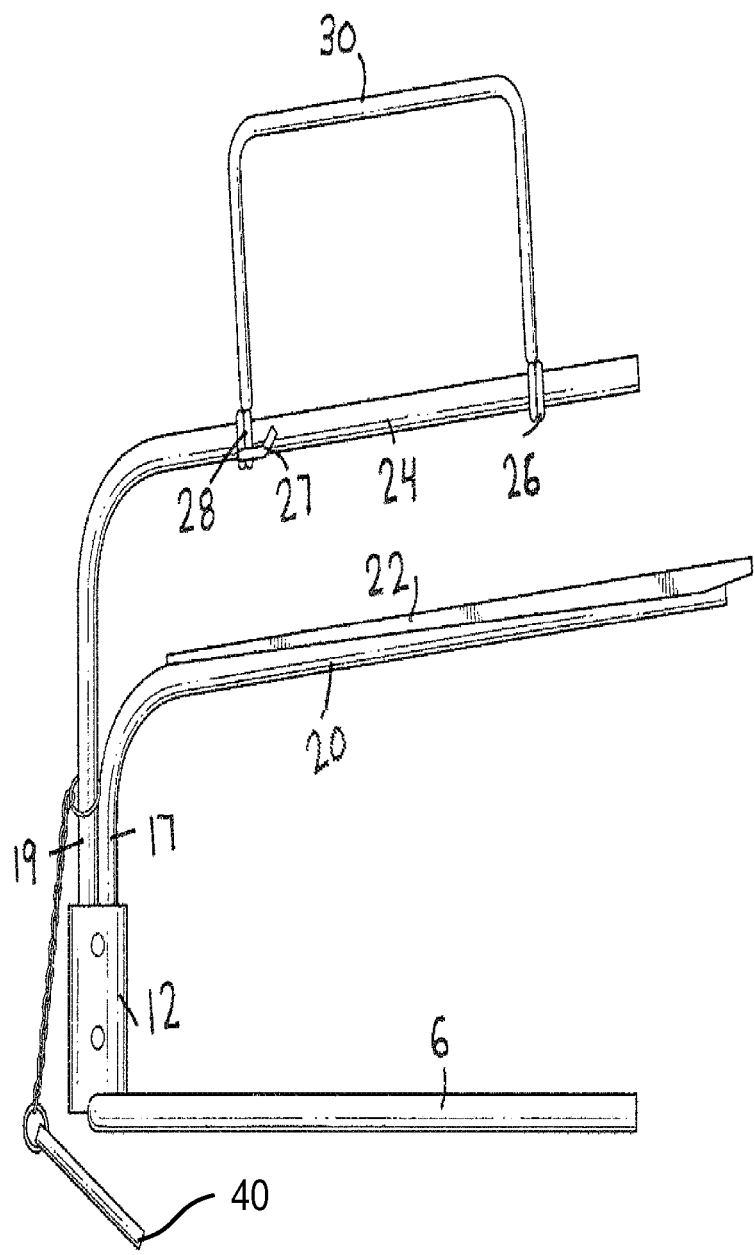
FIG. 3 is a side view of the rack.
Figure 4B:
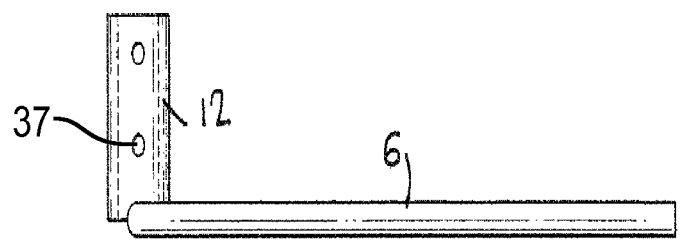
FIG. 4B is a side view of the stand.
Figure 4A:
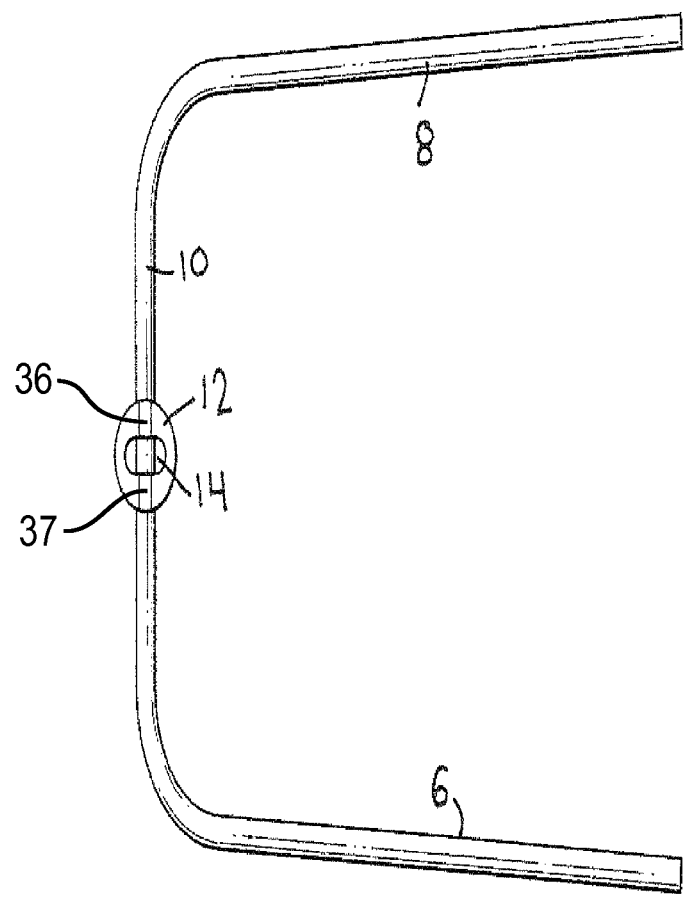
FIG. 4A is a top view of the stand.
Figure 7:
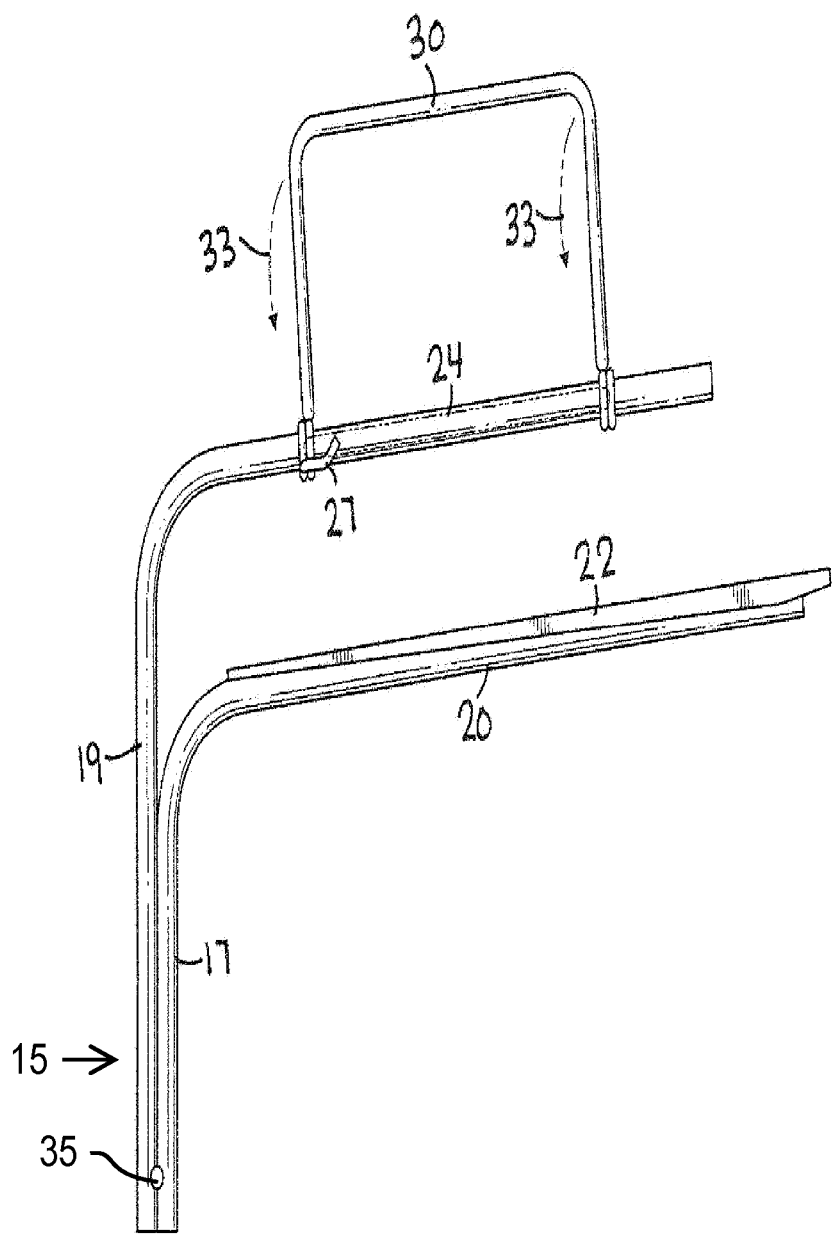
FIG. 7 is a side view of the vertically superimposed branches of the supporting post.

Superimposed over the bird carrying branch 20 of the rack is a handle mounting branch 24 which is bent substantially horizontally from a rod 19 forming the other half of the post 15. Both the rod 24 and the rod 20 are located in a vertical plane 25 that bisects the space between the stand legs 6 and 8. The branch 24 carries a handle 30 that is attached to the branch rod 24 by circular wire wraps 26 and 28 that are loosely arranged around the branch rod so as to allow the handle to rotate around the branch, as indicated by the arrows 33 in FIG. 7. One end 27 of the wire wrap 28 protrudes away from the rod 24 and acts as a stop for the rotation of the handle where it may reside over the breast of the bird, as shown in FIG. 2 or be raised into a carrying position, as shown in FIGS. 1 and 3. The handle branch 24 is positioned directly over the bird holding branch 20 in order to balance the load when in the carrying mode.

For convenience in storing the roasting rack, the post 15 and its integral branches 20 and 24 are preferably detachable from the stand 5. In order to use the rack, the post 15 is inserted into the central opening 14 of the sleeve 12. When inserted, an aperture 35 in the post 15 comes into alignment with aligned apertures 36 and 37 in the sleeve 12. The shaft of a pin 40 is inserted into the aligned apertures to secure the post 15 to the stand 5. After use, the pin 40 can be removed so that the two elements of the rack may be separated and positioned together in a single plane for compact storage.

What is claimed is:

1. A roasting rack comprising,
   a horizontally disposed stand having interconnected and spaced apart legs,
   a sleeve vertically attached to the midpoint of said stand, said sleeve comprising a vertical central opening and a horizontal side opening intersecting said vertical central opening,
   a vertically disposed post inserted in said central opening, said post having a first vertical rod bent laterally into a first horizontally disposed branch and a second vertical rod bent laterally into a second horizontally disposed branch wherein said first rod comprises a first notch and said second rod comprises a second notch facing said first notch, and
   a pin inserted through said side opening and between said first and second notch such that said post is anchored in said sleeve,
   a fowl supporting saddle carried by the second branch; and
   a handle pivotally attached to said first branch by a first and second wire wrap; wherein said first wire wrap protrudes away from said first branch to act as a stop for the rotation of said handle such that said handle may reside in a horizontally disposed orientation said saddle being made of a planar sheet of material bent into a downwardly facing longitudinal open curve around said second branch.

2. The roasting rack of claim 1 where the first and second branches are situated in a vertical plane that bisects the space between the legs of the stand.

3. The roasting rack of claim 1 where the vertically disposed post is detachably connected to the stand.

4. The roasting rack of claim 1 wherein said stand is made from a stainless steel rod with a diameter of 5/16 inch or greater.

5. The roasting rack of claim 1 wherein said saddle has a narrow end near said post and a wide end away from said post.

6. The roasting rack of claim 1 wherein said legs are splayed open.

7. The roasting rack of claim 1 wherein said first vertical rod and said second vertical rod have the same diameter, the horizontal width of said vertical opening is equal to or greater than said rod diameter, and the horizontal length of said vertical opening is equal to or greater than twice said rod diameter.

8. The roasting rack of claim 1 wherein said first vertical rod and said second vertical rod are bonded to each other.

9. The roasting rack of claim 1 wherein said first branch and said second branch are parallel to each other and inclined away from said post at an upward angle relative to horizontal.

10. The roasting rack of claim 1 wherein said saddle and said second branch extend horizontally past the ends of said legs.

\* \* \* \* \*